A. ANDERSON.
Culinary Boiler.

No. 123,662.                    Patented Feb. 13, 1872.

WITNESSES.
Jas. L. Ewin
Walter Allen

INVENTOR.
Alexander Anderson
By Knight Bros.
Attorneys.

123,662

UNITED STATES PATENT OFFICE.

ALEXANDER ANDERSON, OF LONDON, CANADA.

IMPROVEMENT IN CULINARY-BOILERS.

Specification forming part of Letters Patent No. 123,662, dated February 13, 1872.

Specification describing an Improvement in Culinary-Boilers, invented by ALEXANDER ANDERSON, of London, Province of Ontario, Dominion of Canada.

The improvement consists in attaching the boiler eccentrically with a shell whose lower edge rests upon the stove-top around the pot-hole, while the bottom of the pot is so upheld that vapors and smell from the cooking food are allowed to escape through the pot-hole into the fire. The lid which rests upon the upper edge of the shell is perforated for the passage of air inwardly and shelves downwardly to the center, so that the rising steam is to some extent condensed in the under side and drips back into the pot.

Figure 1:
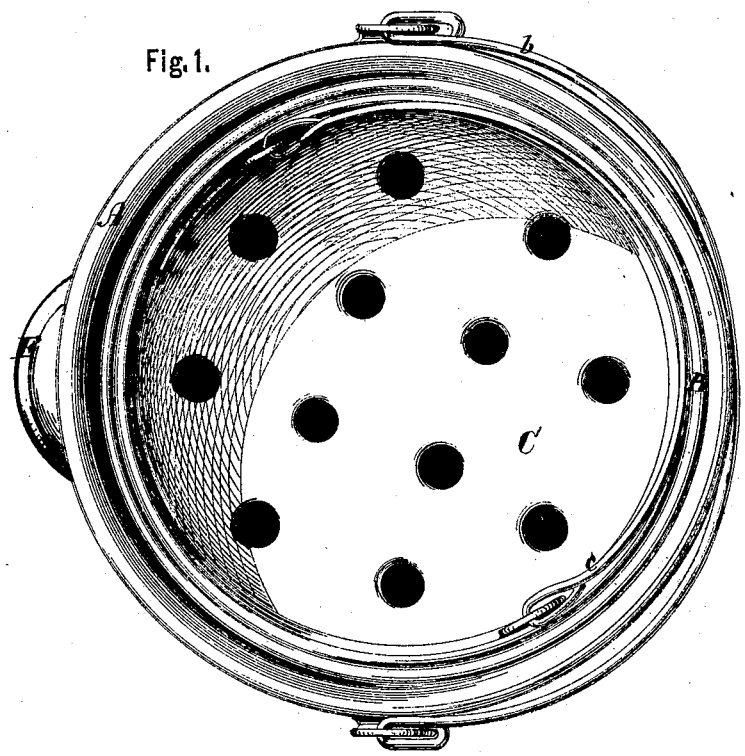
Figure 2:
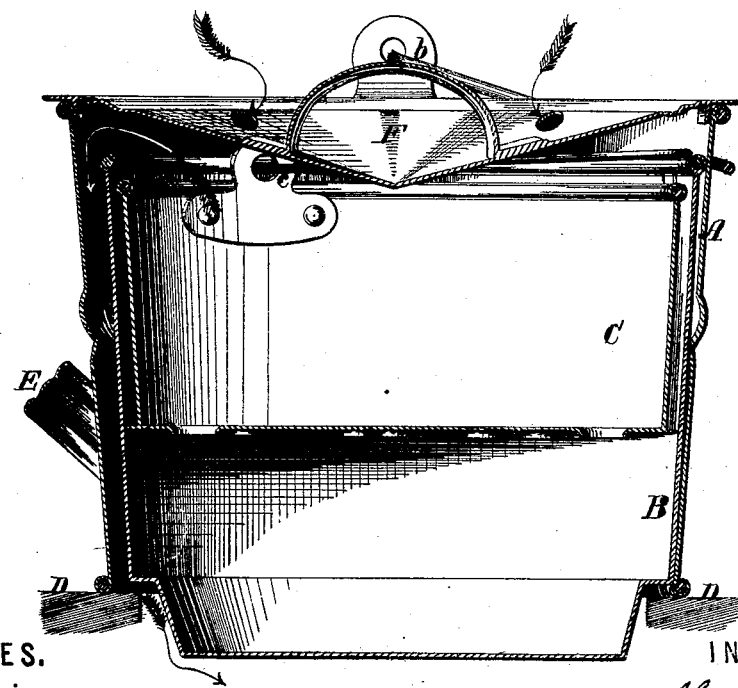

In the drawing, Figure 1 is a top view of a piece of stove-furniture, constructed according to my improvements. The lid is removed and the eye looks down upon the upper rims of the shell, the pot, and a steamer in the latter. Fig. 2 is a vertical central section of the same.

A is a cylindrical shell of cast or sheet-iron, large enough to contain the inclosed pot B, which is set eccentrically into the shell, so as to touch the latter on one side, where it is joined thereto, and leave an opening at the other side to permit vapor to pass between it and the shell to the stove-hole and thence to the fire-chamber. C is a steamer set within the pot B, as illustrative of the relational position of such a vessel to the culinary-boiler B. The steamer is lifted by the bail $c$ and the pot by the bail $b$, one bail serving for both pot and shell, as they are riveted together. The shell is higher than the pot, to give room for the sunken lid and passage of air. Fig. 2 shows the relation which the pot-bottom bears to the stove-hole, being supported clear of the latter by the edge of the shell A resting upon the stove top D. The space between the pot and the hole allows the escape downward of vapor and of air, while heat will radiate upwardly. E is a handle on the side of the shell A, and by it the pot is inclined when it becomes necessary to pour out its contents, which escape at the side where the pot and shell are in contact. F is a lid which rests upon the upper rim of the shell A and slants downwardly toward the center. It has perforations, at which air enters and passes toward the fire, thus tending to keep the lid somewhat cool. As the vapor arises a portion becomes condensed on the under side of the lid, and, trickling down the plate, drops again into the pot.

The objects of the invention are to secure economy of fuel by preventing the unnecessary radiation of heat into the room.

In use, it is well to turn toward the outer margin of the stove the side of the pot which adheres to the shell, so that the fire may not be damped by undue cooling of the air passing downwardly to the fire through the interval between the pot and the shell, as seen in Fig. 2.

Claims.

What I claim as new is—

1. The permanent eccentric shell A attached to the boiler B at one side, and thus supporting the latter and providing for emptying the same, as shown and described.

2. The perforated shelving lid F, in combination with the shell A and boiler B, for the purposes specified.

ALEXANDER ANDERSON.

Witnesses:
E. H. DUGGAN, *of London, Barrister.*
HENRY VIVIAN.